(12) United States Patent
Zhang

(10) Patent No.: US 9,398,531 B1
(45) Date of Patent: Jul. 19, 2016

(54) DYNAMIC FIELD CONTROL METHOD AND SYSTEM TO CONSERVE ENERGY DURING NFC COMMUNICATION

(71) Applicant: Intel IP Corporation, Santa Clara, CA (US)

(72) Inventor: Lei Zhang, Aix en Provence (FR)

(73) Assignee: Intel IP Corporation, Santa Clara, CA (US)

( * ) Notice: Subject to any disclaimer, the term of this patent is extended or adjusted under 35 U.S.C. 154(b) by 0 days.

(21) Appl. No.: 14/750,350

(22) Filed: Jun. 25, 2015

(51) Int. Cl.
   *H04B 5/00* (2006.01)
   *H04W 52/02* (2009.01)
   *H04W 4/00* (2009.01)

(52) U.S. Cl.
   CPC ......... *H04W 52/0209* (2013.01); *H04B 5/0031* (2013.01); *H04W 4/008* (2013.01)

(58) Field of Classification Search
   CPC . H04B 5/0031; H04W 52/0209; H04W 4/008
   USPC ........................................................ 455/41.1
   See application file for complete search history.

(56) References Cited

U.S. PATENT DOCUMENTS

| | | | | |
|---|---|---|---|---|
| 8,929,549 | B2* | 1/2015 | Pang | H04W 48/20 370/311 |
| 9,066,197 | B2* | 6/2015 | Kiukkonen | H04W 52/0229 |
| 2012/0322368 | A1* | 12/2012 | Desai | H04W 76/023 455/41.1 |

* cited by examiner

*Primary Examiner* — Eugene Yun
(74) *Attorney, Agent, or Firm* — Salehi Law Group

(57) ABSTRACT

The disclosure relates to dynamic field control method to save energy and significantly reduce battery consumption during NFC real time communication between NFC devices. In an exemplary embodiment provides a method to dynamically control the NFC field according to the data exchange status to thereby significantly reduce power consumption. The disclosed embodiment is particularly suitable for NFC for long term communication between two NFC mobile devices.

20 Claims, 5 Drawing Sheets

DYNAMIC FIELD CONTROL METHOD AND SYSTEM TO CONSERVE ENERGY DURING NFC COMMUNICATION

BACKGROUND

1. Field

The disclosure generally relates to method and apparatus for low power NFC communication. More specifically, the disclosure relates to dynamic field control method to save energy and significantly reduce battery consumption during NFC real time communication between NFC devices.

2. Description of Related Art

Near field communication (NFC) is directed to technology that enables smart devices and other devices to establish radio communication with each other by touching the devices together or bringing them into proximity to a distance of typically 10 cm (3.9 in) or less. Early NFC business models were unsuccessful as they were overtaken by alternative technologies such as barcodes or UHF tags. Unlike barcodes and UHF tags, however, NFC devices are often cloud connected. All NFC-enabled smartphones can be provided with dedicated apps including so-called ticket readers as opposed to the traditional dedicated infrastructure that specifies a particular (often proprietary) standard for stock ticket, access control and payment readers.

NFC devices use electromagnetic induction between two loop antennae (i.e., RF field) when NFC devices (e.g., a smartphone and a smart-poster) come close to each other to exchange information. NFC sessions operate within the globally available unlicensed radio frequency Industrial, Scientific and Medical (ISM) radio band of 13.56 MHz on ISO/IEC 18000-3 air interface and support different data transmission rates.

Once a conventional NFC device (initiator) detects another NFC device (target) within its NFC RF field, Initial Detection phases (i.e., technology detection, Collision resolution phase; Activation phase) are triggered. Applications data can then be exchanged between the two NFC devices after the initial Detection phase. Thereafter, the initiator device must maintain its RF field ON regardless of whether there is application data to exchange between the initiator and target devices. The conventional NFC system has to maintain the RF field ON even when no upper layer application data is to be exchanged. That is, only when an NFC target is removed the conventional NFC field is disabled. As long as the two devices are close, NFC field is enabled even if there is no data need to be exchanged. The conventional NFC devices are inefficient.

BRIEF DESCRIPTION OF THE DRAWINGS

These and other embodiments of the disclosure will be discussed with reference to the following exemplary and non-limiting illustrations, in which like elements are numbered similarly, and where.

DETAILED DESCRIPTION

Figure 1:
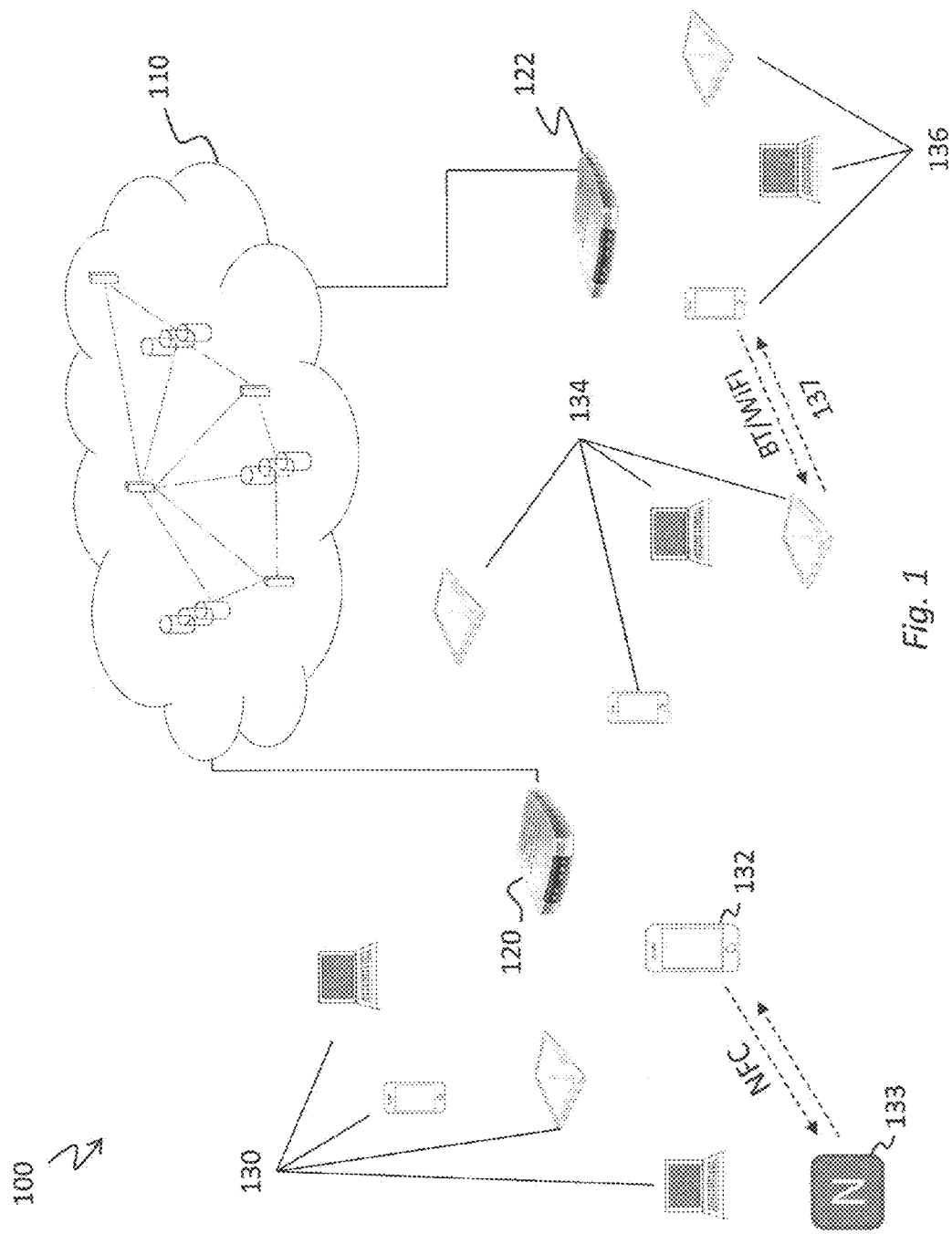
FIG. 1 shows a wireless environment for implementing an embodiment of the disclosure.

In certain embodiments, the disclosure relates to NFC Dynamic Field Control (NDFC) method to dynamically control the NFC field status intelligently.

Certain embodiments may be used in conjunction with various devices and systems, for example, a mobile phone, a smartphone, a laptop computer, a sensor device, a Bluetooth (BT) device, an Ultrabook™, a notebook computer, a tablet computer, a handheld device, a Personal Digital Assistant (PDA) device, a handheld PDA device, an on board device, an off-board device, a hybrid device, a vehicular device, a non-vehicular device, a mobile or portable device, a consumer device, a non-mobile or non-portable device, a wireless communication station, a wireless communication device, a wireless Access Point (AP), a wired or wireless router, a wired or wireless modem, a video device, an audio device, an audio-video (AV) device, a wired or wireless network, a wireless area network, a Wireless Video Area Network (WVAN), a Local Area Network (LAN), a Wireless LAN (WLAN), a Personal Area Network (PAN), a Wireless PAN (WPAN), and the like.

Some embodiments may be used in conjunction with devices and/or networks operating in accordance with existing Institute of Electrical and Electronics Engineers (IEEE) standards (IEEE 802.11-2012), IEEE Standard for Information technology-Telecommunications and information exchange between systems Local and metropolitan area networks—Specific requirements Part 11: Wireless LAN Medium Access Control (MAC) and Physical Layer (PHY) Specifications, Mar. 29, 2012; IEEE 802.11 task group ac (TGac) ("IEEE 802.11-09/0308r12—TGac Channel Model Addendum Document"); IEEE 802.11 task group ad (TGad) (IEEE 802.1 1ad-2012, IEEE Standard for Information Technology and brought to market under the WiGig brand—Telecommunications and Information Exchange Between Systems—Local and Metropolitan Area Networks—Specific Requirements—Part 11: Wireless LAN Medium Access Control (MAC) and Physical Layer (PHY) Specifications—Amendment 3: Enhancements for Very High Throughput in the 60 GHz Band, 28 Dec. 2012)) and/or future versions and/or derivatives thereof, devices and/or networks operating in accordance with existing Wireless Fidelity (Wi-Fi) Alliance (WFA) Peer-to-Peer (P2P) specifications (Wi-Fi P2P technical specification, version 1.2, 2012) and/or future versions and/or derivatives thereof, devices and/or networks operating in accordance with existing cellular specifications and/or protocols, e.g., 3rd Generation Partnership Project (3GPP), 3GPP Long Term Evolution (LTE), and/or future versions and/or derivatives thereof, devices and/or networks operating in accordance with existing Wireless HDTM specifications and/or future versions and/or derivatives thereof, units and/or devices which are part of the above networks, and the like.

Some embodiments may be implemented in conjunction with the BT and/or Bluetooth low energy (BLE) standard. As briefly discussed, BT and BLE are wireless technology standard for exchanging data over short distances using short-wavelength UHF radio waves in the industrial, scientific and medical (ISM) radio bands (i.e., bands from 2400-2483.5 MHz). BT connects fixed and mobile devices by building personal area networks (PANs). Bluetooth uses frequency-hopping spread spectrum. The transmitted data are divided into packets and each packet is transmitted on one of the 79 designated BT channels. Each channel has a bandwidth of 1 MHz. A recently developed BT implementation, Bluetooth 4.0, uses 2 MHz spacing which allows for 40 channels.

Some embodiments may be used in conjunction with one way and/or two-way radio communication systems, a BT device, a BLE device, cellular radio-telephone communication systems, a mobile phone, a cellular telephone, a wireless telephone, a Personal Communication Systems (PCS) device, a PDA device which incorporates a wireless communication device, a mobile or portable Global Positioning System (GPS) device, a device which incorporates a GPS receiver or transceiver or chip, a device which incorporates an RFID element or chip, a Multiple Input Multiple Output (MIMO) transceiver or device, a Single Input Multiple Output (SIMO) transceiver or device, a Multiple Input Single Output (MISO) transceiver or device, a device having one or more internal antennas and/or external antennas, Digital Video Broadcast (DVB) devices or systems, multi-standard radio devices or systems, a wired or wireless handheld device, e.g., a Smartphone, a Wireless Application Protocol (WAP) device, or the like. Some demonstrative embodiments may be used in conjunction with a WLAN. Other embodiments may be used in conjunction with any other suitable wireless communication network, for example, a wireless area network, a "piconet", a WPAN, a WVAN and the like.

In one embodiment, the disclosure relates to method and apparatus for saving energy in NFC communication by dynamically disabling the NFC field when not engaged in active communication. In an exemplary application, the disclosed embodiments bypass the initial NFC Detection phase when the NFC field is re-enabled, when sending a probe message after sleep or when initiator wants to send a packet during T-Probe duration.

As described in the specific, an NFC device may comprise a device featuring different operating modes based on NFC radio frequency (RF) technology. There may be three operating modes: NFC reader/writer (PCD); NFC tag emulation (PICC) and NFC peer to peer (P2P). The Proximity Coupling Device (PCD) may be the NFC reader/writer. The PCD can be a transmitter that can read NFC tags. The tag or a card emulation device may be defined as the Proximity Inductive Coupling Card (PICC).

In one application, the reader (PCD) emits an electromagnetic field that powers the communication with PICC. Once powered, the PICC modulates the incoming signal and responds to PCD with the modulated signal. The conventionally PICC uses load modulation scheme and its response to PCD may be in the form of an Acknowledgment (ACK).

Conventional PICCs (e.g., NFC tag emulation) may include a transponder that can be read or be written by a proximity reader device (PCD). The tags/emulated cards generally may not need a power supply (i.e., battery) and may be powered by the electromagnetic field of the reader (PCD) for the NFC communications.

The NFC P2P mode (defined by ISO 18092) allows two NFC enabled devices to establish a bidirectional connection to exchange data. During the P2P communication one device that initiates the conversation between two P2P devices is the Initiator and the other device is the Target. In P2P passive mode, the Initiator enables the NFC field and powers the NFC mutual communication. In P2P Active mode, each of the two devices (the Initiator or Target) may enable NFC field while sending packets to peer device.

Long-term based NFC real time communication refers to communication where data is exchanged between two coupled (e.g., fixed, pasted, plugged or tagged) NFC devices periodically or occasionally in real time. For example, a NFC interface tag (e.g., NFC tag that integrates a sensor) may be fixed, pasted or plugged on a NFC smart device (e.g., NFC smartphone or industrial PDA) and it can send measured data periodically to the NFC smart device. The data transmission may also be trigged by events detected by a sensor. The sensor may be, for example, a temperature sensor or a gyroscope. In another example, a NFC enabled Action module which is fixed, pasted or plugged on a NFC smart device can receive the commands from NFC smart device via NFC communications (i.e., command is triggered by a user) and then trigger the corresponding operations. Such long-term based NFC real time communications are usually implemented in applications that data should be exchanged in real time but is not required to be exchanging all the time.

It should be noted that in conventional PCD-PICC communications, PCD is also called the Initiator because it enables the NFC field, initiates the conversation and powers the mutual communication. The PICC is also called Target, which transmits packets to Initiator based on Initiator's generated NFC field. In P2P communication, Initiator refers to the NFC device that initiates the conversation between two P2P devices. In P2P passive mode, the Initiator is a PCD that enables the NFC field and powers the communication. In P2P Active mode, either Initiator or Target can enable the NFC field while transmitting a packet to the peer device.

As briefly discussed, NFC communications have been widely used in their two principle communication modes: PCD-PICC and P2P mode. In PCD-PICC mode, Initiator (PCD) is a NFC reader/writer which emits an electromagnetic field to power the command-based communications with Target (PICC), and Target can be a NFC tag or a NFC device that is configured as an emulated NFC card. In P2P mode, the Initiator triggers the communication; in P2P passive mode, Initiator powers NFC field for the communication. In P2P active mode, each of the two devices (Initiator or Target) enable NFC field while sending packets to peer device. Based on ISO 18092 standard, LLCP (Logical Link Control Protocol) and SNEP (Simple NDEF Exchange Protocol) have been introduced to support reliable P2P data exchange between two NFC devices.

While a majority of NFC applications (e.g., secure access control, information P2P sharing, NFC wireless payments, etc.) require short term communication, the increasing utility of Internet of Things (TOT), M2M (Machine to Machine) and small hardware modules require long term NFC sessions.

In one embodiment, a small and low-cost NFC enabled hardware module (e.g., a NFC enabled sensor/capture module, an action module, etc.) can be coupled (fixed, pasted, plugged or tagged) on another NFC device (i.e., smartphone or PDA). The measured and/or captured data from the hardware module can be periodically transferred to NFC device in real time via NFC communication. A user can, from time to time, send commands from a NFC device to a plugged hardware module to trigger different operations via NFC communications. Such NFC based hardware modules can be easily uncoupled (unplugged or taken down) from a NFC device when not in use.

For example, a small NFC interface tag with an integrated temperature sensor may be coupled to an NFC smartphone. Temperatures can then be periodically measured and sent to NFC smartphone in real time via NFC communication and the integrated sensor may also be powered by the NFC communication field. In another example, a NFC tag with integrated infrared module may be coupled onto a NFC smartphone to convert the smartphone to a TV controller. When NFC supports higher data rates, the hardware module may include a high-end camera lens with only NFC communication capability. The NFC based lens may be fixed on any NFC smartphone and transfer photos or frames directly to a smartphone in real time via NFC.

Compared to other wireless communications (i.e., WiFi, BT), the advantage of the long term based NFC real time communication is that smart hardware modules can be powered directly by NFC communication field and do not need an additional battery. For example, when a sensor integrated NFC tag is close to a NFC smart device, the NFC smart device can power the NFC communication as well as the sensor measurements.

In certain embodiments, the disclosure provides a NFC dynamic field control method (NDFC) to save energy and significantly reduce battery consumption during NFC session(s). The dynamic field control is particularly effective for long term based NFC real time communication between two or more NFC devices. In an exemplary implementation, two NFC devices (e.g., a small and low-cost NFC enabled hardware module and a NFC smart device) may be coupled for periodic data exchange triggered by user(s). According to the current NFC standards (i.e., the NFC forum and the related specifications), as soon as two NFC devices are getting close, one of them generates NFC RF field. The NFC field has to be always kept ON even when no application data is exchanged between the devices. The conventional systems waste energy especially for long term real time communication where the initiator keeps the field ON for long periods of time and exchange application data occasionally. Similarly in P2P active NFC sessions, as soon as one device has finished transmitting a packet and turns OFF the field, the peer device has to enable the field at once even if no application data is to be sent.

In one embodiment, the disclosure provides dynamical field control to power a NFC field intelligently to save energy, for example, by turning the RF field OFF if no application data is exchanged between the NFC devices. The RF field is automatically turned ON to support communication if any of the NFC devices has data to exchange without having to go through the initial Detection phase.

During NFC communications when a Target is detected in an Initiator's field range, the Initiator enables the NFC RF field and triggers the Initial Detection phase before entering into the Data Exchange phase. The initial detection phase process may include Technology Detection phase; Collision Resolution phase; Activation phase. The Data Exchange phase allows exchange of application data between the devices in an NFC session. According to the conventional NFC protocols, even if there is no application data to exchange the NFC field must remain ON during the Data Exchange phase. This holds true as long as the Target is in the Initiator's field range. The always ON requirement expends significant energy especially for long term based real time NFC sessions. This is similar in P2P active mode NFC sessions, when one device finishes sending out one message and turns OFF the NFC field, the peer device has to turn ON the field immediately to keep the connection alive even if no application data is to be exchange.

In one embodiment of the disclosure, during the Data Exchange phase—when no data needs to be exchanged between the two NFC devices—the Initiator turns off the NFC field, and enters into PROBE state. In one implementation, the Initiator periodically sends a PROBE beacon message to the Target. The Target may reply after receiving each beacon message. During this time, the RF field is only turned ON to support beacon message sending/replying. The beacon message allows Initiator to detect: (1) whether Target remains in the Initiator's field range; and (2) whether Target has some application data to actively send to Initiator in terms of the response of the beacon message.

After the Initial Detection phase, Initiator can go to Data Exchange state or to Probe state. During the Probe state, if either Initiator or Target has application data to send to each other, the Initiator can turn the RF field ON (i.e., for PCD-PICC mode and P2P passive mode) and trigger the data exchange directly without re-passing the initial detection phases (i.e., Technology detection phase; Collision resolution phase; Activation phase) since the Initiator has already obtained information of the Target during the Initial Detection State. The information includes which NFC technology is engaged to communicate with Target. The information is not changed since Target is detected to be always in proximity according to the reply of the periodic PROBE beacon message. Otherwise, if Target is detected to be removed according to the absence of the PROBE reply message, Initiator will return to IDLE state and will be ready to detect a new Target. If data exchange session is finished (i.e., determined by Initiator or notified by Target), the Initiator will then turn OFF the RF field and returns to PROBE state. This method enables significant power savings especially for long term based NFC sessions.

FIG. 1 shows a wireless environment for implementing an embodiment of the disclosure. The environment of FIG. 1 may include NFC devices. Specifically, FIG. 1 shows environment 100 having network 110 communicating with access points (APs) 120, 122. The APs may refer to access points of different wireless technology such as WLAN, Zigbee, 3G/4G/5G, Wimax, etc. Network 110 can define an internet backbone. While FIG. 1 shows APs 120 and 122 as part of network 110, the disclosed principles are not limited thereto and are equally applicable to environments where the AP is outside the network. Exemplary wireless stations (STAs) include NFC-capable smartphones, laptops, Ultrabooks, tablets, embedded computing devices, wearable computing devices or any other wireless NFC-capable device. Each STA may be coupled (not shown) to another NFC device (e.g., sensor integrated NFC tag, NFC enabled Action module).

FIG. 1 also shows the NFC long term communication between two NFC devices (e.g., NFC-enabled smart phone 132 and sensor integrated NFC tag 133) can be standalone, meaning that the NFC device (e.g., smartphone) only receives measured data and can treat the data locally. NFC-enabled device 132 may also connect to a remote system. The communication between a NFC device 132 and remote server (e.g., for transmitting measured data) can be via other wireless technology.

Communication may be established among STAs directly by WiFi-direct or Bluetooth as shown by arrows 137. These STAs may further communicate with any of the APs 120, 122. STA 132 may only communicate with the coupled NFC device 133 and no extra wireless network may be involved. STA 130, 132, 134 and 136 can also communicate between them via WiFi or Bluetooth without extra wireless network.

Figure 2:
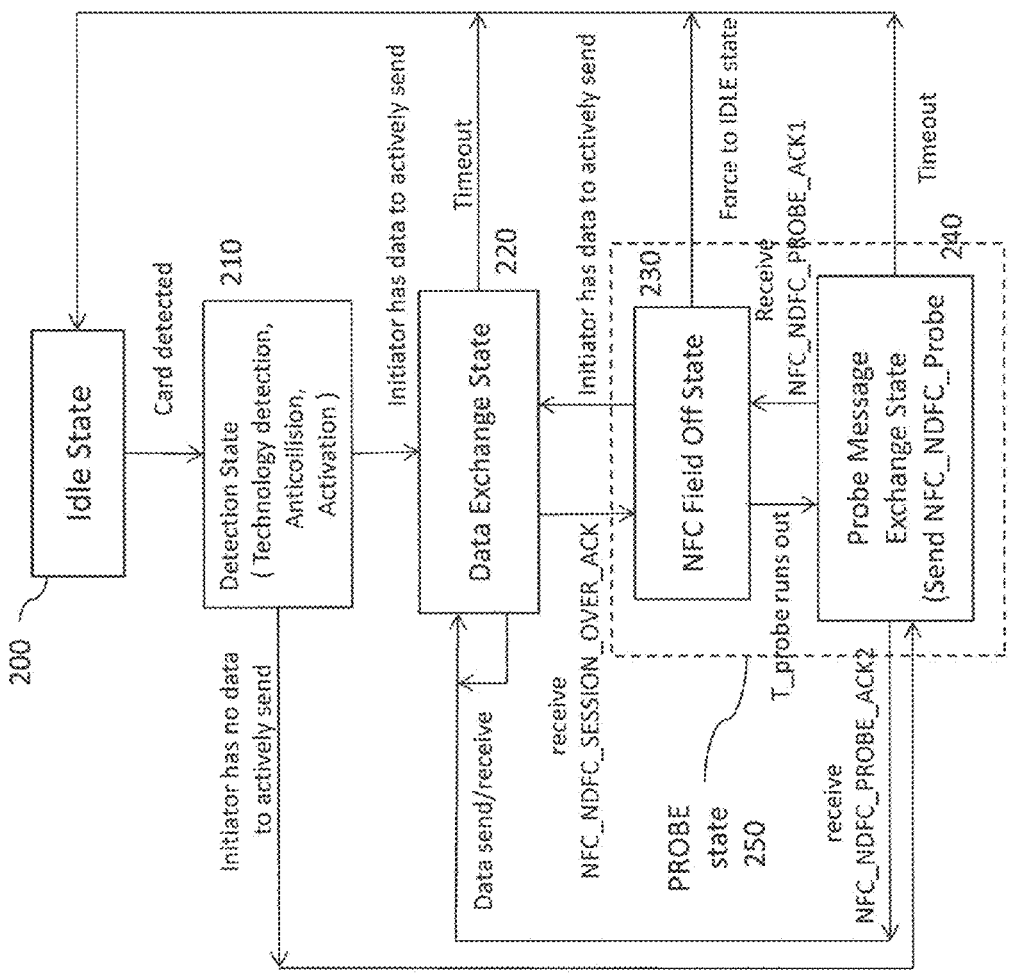
FIG. 2 shows an exemplary State diagram of Initiator for implementing an embodiment of the disclosure

FIG. 2 shows an exemplary State diagram of Initiator for implementing an embodiment of the disclosure. The NFC system represented by FIG. 2 may be implemented in the environment of FIG. 1. More specifically, FIG. 2 shows an exemplary process for establishing NFC communication sessions while dynamically conserving power. The process of FIG. 2 includes process steps: Idle state 200, Detection state 210, Data Exchange state 220, NFC Field Off State 230 and Probe Message Exchange state 240. The Probe State 250 is shown as combination of NFC Field Off State 230 and Probe Message Exchange State 240.

The exemplary implementation of FIG. 2 starts at step 200 when the Initiator is in Idle state. When a Target is detected in an Initiator's NFC field range, Initiator turns ON the RF field and normally triggers the Detection phase 210. Detection phase 210 may be considered as the initial detection phase. Initial Detection phase 210 may include: Technology Detection phase; Collision Resolution phase and Activation phase. Initial Detection phase may be defined in NFC forum standards.

Technology Detection phase allows detecting which technology (e.g., NFC-A, NFC-B, NFC-F, etc.) to be used to support communication between NFC Initiator and Target. In the beginning of the Technology Detection phase, Initiator sends corresponding request packet respectively in technology NFC-A, NFC-B, NFC-F, etc. The target will reply if target receives the first technology supported packet. Collision Resolution phase allows Initiator to avoid collision and select one NFC device in case that multiple NFC devices (e.g., NFC tags) with the same technology are present within the field of NFC Initiator. Finally, the Activation phase activates one NFC device out of the set of devices identified during Technology Detection phase and Collision Resolution phase, and then is ready for the Data Exchange phase.

Figure 3A:
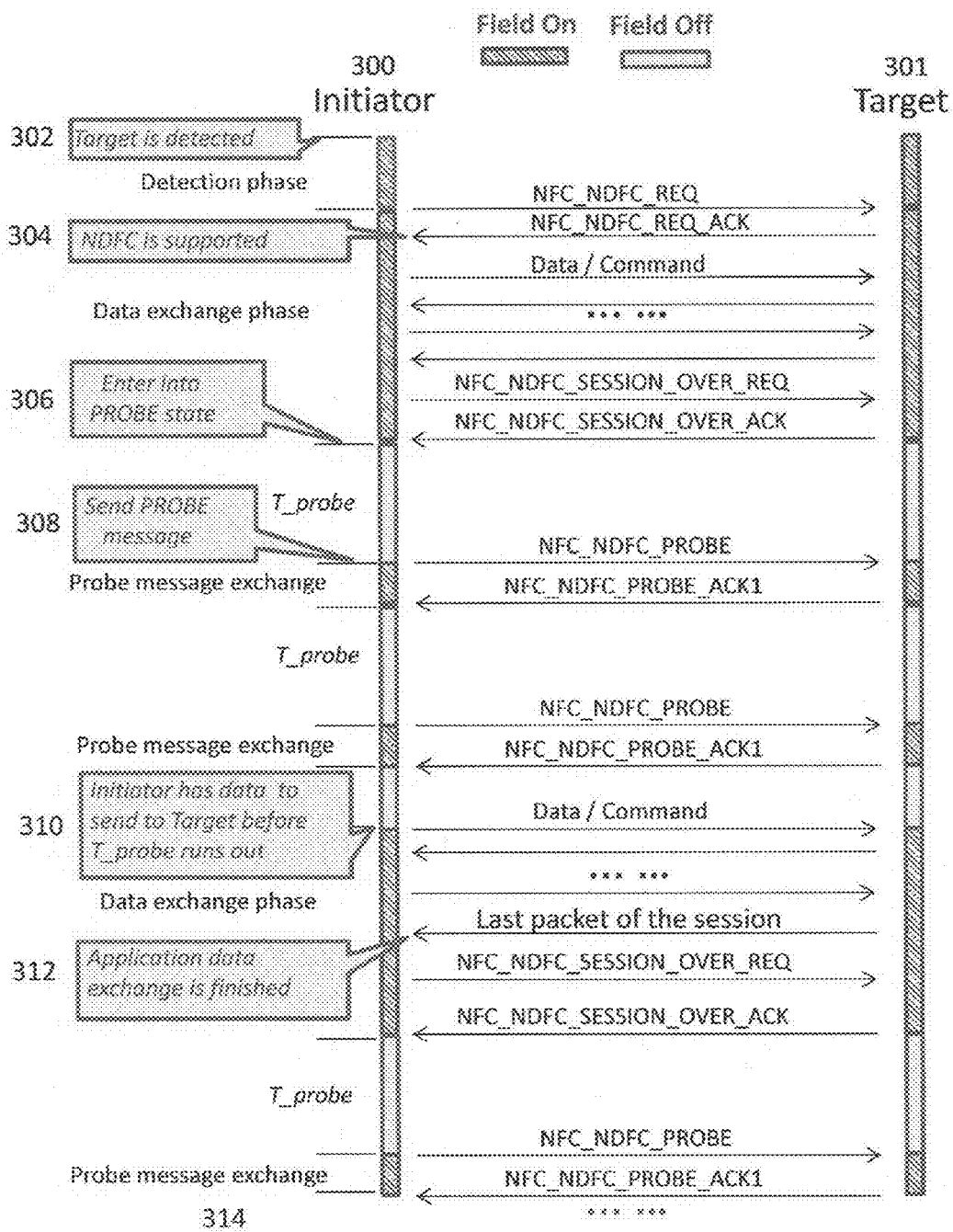
FIG. 3A illustrates an example of full data exchanges in NDFC method according to one embodiment of the disclosure.
Figure 3B:
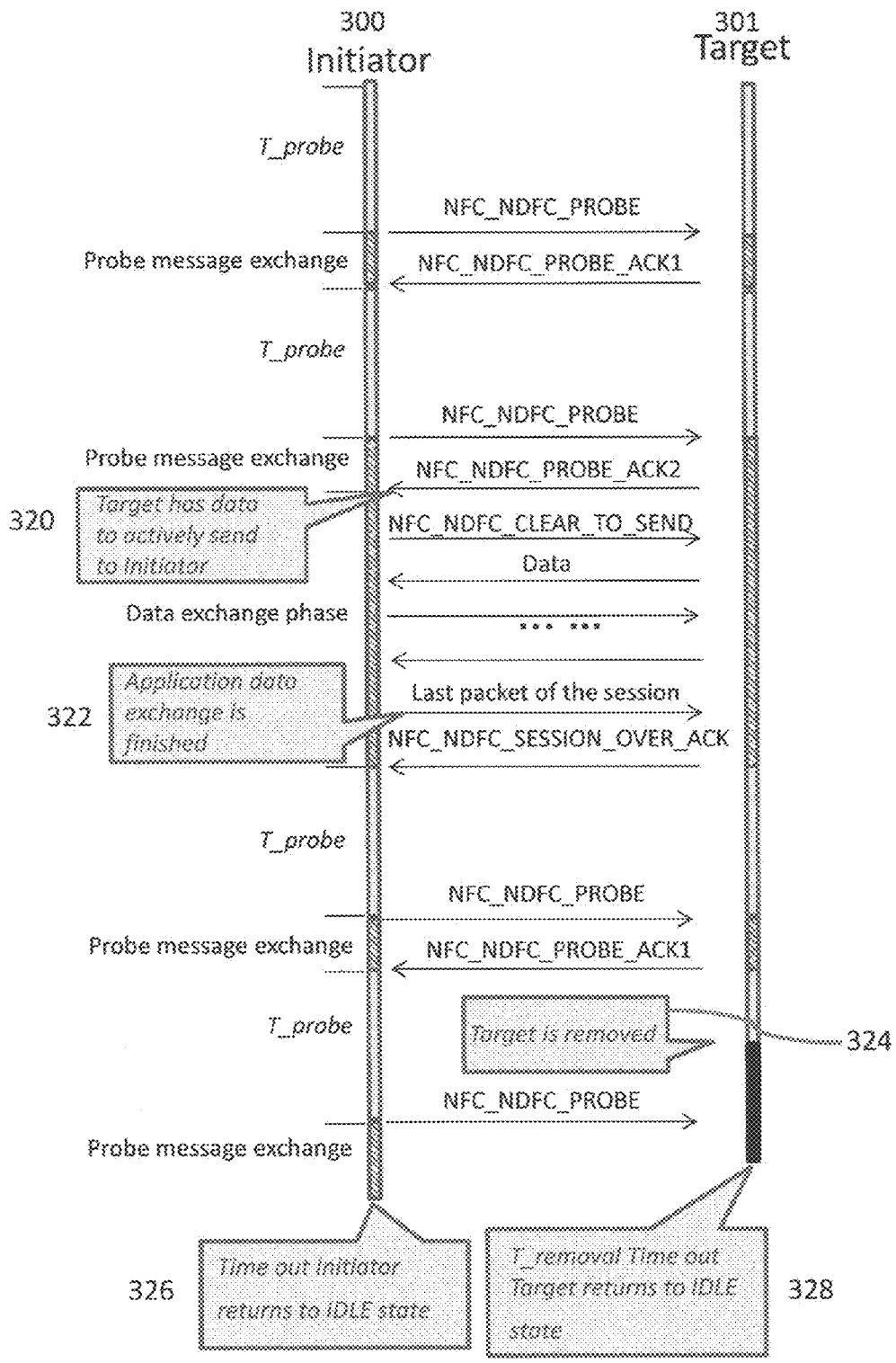
FIG. 3B is a continuation of FIG. 3A illustrating an example of full data exchanges in NDFC method according to one embodiment of the disclosure.

FIG. 3A illustrates an example of full data exchanges in NDFC method according to one embodiment of the disclosure and FIG. 3B is a continuation of FIG. 3A illustrating an example of full data exchanges in NDFC method according to one embodiment of the disclosure. The following discussion refers to FIG. 2, 3A or 3B simultaneously.

After the Activation phase in Detection State when target is detected (step 302, FIG. 3A), Initiator (300, FIG. 3A) may send a command (i.e., NFC_NDFC_REQ) to Target to detect (301, FIG. 3A) whether Target supports the NDFC method. If Target (300, FIG. 3A) replies with and acknowledgement (i.e., NFC_NDFC_REQ_ACK) message, meaning that NDFC method is supported by Target, the NDFC mode will be used for all future communication between Initiator and Target. This is shown as step 304 in FIG. 3A.

Otherwise, if Initiator (300, FIG. 3A) does not receive a reply with a timeout (e.g., N retransmission timeout) or if Initiator (301, FIG. 3A) receives a non-support message (i.e., NFC_NDFC_REQ_NACK) from Target device, then the default NFC related protocols may be employed for future communication.

In the exemplary NDFC session, NFC_NDFC_PROBE may be defined as a command sent from Initiator (301, FIGS. 3A and 3B) to Target (300, FIGS. 3A and 3B). While receiving this packet, Target (300, FIGS. 3A and 3B) may either reply with the packet NFC_NDFC_PROBE_ACK1 (which means that Target is in Initiator's field range), or reply with the packet NFC_NDFC_PROBE_ACK2 (which means Target is in Initiator's field range, and informs Initiator that Target has some data to actively send to Initiator).

After the Detection State and the NFC_NDFC_REQ/ NFC_NDFC_REQ_ACK exchange, if the Initiator has no data to actively send to Target, the flow diagram goes to step 240 (FIG. 2), the Probe Message Data Exchange State. If the Initiator has data to actively send (step 220, FIG. 2) the Initiator enters into Data Exchange phase. The following discusses these two possible cases.

CASE 1—When Initiator (300, FIG. 3A) has data (i.e., commands/application data) to actively send to Target (301, FIG. 3A) or wants to trigger P2P data exchange session. Here, in PCD-PICC mode, the Initiator starts sending commands to Target (e.g., SELECT command, custom-defined command, etc.). In P2P mode, the Initiator sends commands to initially establish P2P connection and triggers the P2P data exchange session (e.g., based on P2P Snep Put or Snep Get). When the data exchange session is finished (which means, for example, in PCD-PICC mode: Initiator receives the last reply from Target and has no longer command to send; in P2P mode, Initiator receives last data exchange message or P2P acknowledge message such as Snep success response), the Initiator will then send a command NFC_NDFC_SESSION_OVER_ REQ to Target. This means that Initiator has no more data to be exchanged with Target and requests to close the current data exchange session.

If Target (300, FIGS. 3A and 3B) does not have data to send to Initiator (301, FIGS. 3A and 3B), the Target will reply with NFC_NDFC_SESSION_OVER_ACK message. When Initiator (301, FIGS. 3A and 3B) receives this message, the Initiator enters into PROBE (step 306, FIGS. 3A and 3B and step 250, FIG. 2). In PROBE state (step 250, FIG. 2), Initiator (300, FIGS. 3A and 3B) will periodically turn off the NFC field for a period T_probe and sends NFC_NDFC_PROBE command to Target (301, FIG. 3A). The command is intended to check: (1) whether Target is still in the Initiator field range, and (2) whether Target has application data to actively send to Initiator. In PROBE state (250, FIG. 2 and for example 306, FIG. 3A), NFC field is only turned ON (not shown) to support NFC_NDFC_PROBE command/answer exchange. In PCD-PICC and P2P passive modes, the NFC field is powered by Initiator (300, FIG. 3A). In P2P active mode, the NFC field is respectively powered by Initiator (300, FIG. 3A) and Target (301, FIG. 3A) for transmitting NFC_NDFC_PROBE command and answer message.

Each time after a NFC_NDFC_PROBE message is sent by Initiator to Target, one of several actions may transpire. First, if Initiator (300, FIG. 3A) does not receive the reply within a timeout (i.e. N retransmission timeout), the Initiator considers that Target (301, FIG. 3A) is removed and enters into IDLE state where it is ready to detect a new Target (for example, after step 326). In cases where the Target is self-powered and is able to manage its state machine, and if Target does not receive NFC_NDFC_PROBE message for a period longer than T removal (step 328, FIG. 3B) since receiving last message, Target (301, FIG. 3B) will consider that it is removed from Initiator's field range and then the Target will return to IDLE state and be ready to be detected by a new Initiator.

If NFC_NDFC_PROBE_ACK1 is received by Initiator (300, FIG. 3A), it means Target (301, FIG. 3A) is still in the field of Initiator and has no application data to send to Initiator. Initiator (301, FIG. 3A) will then return back to PROBE state (i.e., turns the NFC field OFF for a period T_probe before re-sending NFC_NDFC_PROBE command). This is shown as step 314, FIG. 3A followed by T_probe at FIG. 3B.

If NFC_NDFC_PROBE_ACK2 is received by Initiator (which means Target has application data to actively send to Initiator or wants to trigger P2P application data exchange), Initiator then sends a command NFC_NDFC_ CLEAR_TO_SEND to Target. This is shown in step 320 of FIG. 3B. In PCD-PICC and P2P passive modes, Initiator will then keep the NFC field ON. As shown in FIG. 3B, after receiving NFC_NDFC_CLEAR_TO_SEND, Target starts sending application data to Initiator to trigger data exchange session (e.g., PCD-PICC data exchange or P2P connection). Since in this case Target initially triggers the application data exchange, Target may also determine when to finish the application data exchange session (i.e., In PCD-PICC mode, Target receives last application packet (step 322, FIG. 3B); in P2P mode, Target receives last data exchange message or P2P acknowledge message such as Snep success response from Initiator (step 322, FIG. 3B)) and then Target can then send a NFC_NDFC_SESSION_OVER_ACK message directly to inform Initiator that data exchange session is finished. This is shown as step 322 in FIG. 3B. The Initiator then turns OFF the NFC field (for P2P active, Initiator keeps the field OFF) and enters into PROBE state after receiving this message. If Initiator (300, FIG. 3B) sends a Probe message (NFC_NDFC_PROBE) after initiator (301, FIG. 3B) has been removed, the Initiator will receive no response. After a timeout period, Initiator returns to IDLE stat (step 326, FIG. 3B).

CASE 2—In the beginning, if Initiator (300, FIG. 3B) does not have application data to send or does not want to initially trigger a P2P exchange, the Initiator will enters into PROBE state and send NFC_NDFC_PROBE message to Target (301, FIG. 3B) and then follows the procedures described in CASE 1 in terms of answer from Target (i.e., Timeout, NFC_NDFC_PROBE_ACK1 or NFC_NDFC_PROBE_ACK2).

In PROBE state, if Initiator (300, FIG. 3B) wants to trigger data exchange, Initiator can enable the NFC field and start the communication with Target (301, FIG. 3B) at any time without re-passing or going through the initial Detection phase. Initiator (300, FIG. 3B) may follow the same procedure that is discussed in relation to CASE 1. In an exemplary NDFC method, every time after the NFC field is re-enabled, the Initiator is able to start application data exchange or transfer Probe message directly without going through the Initial Detection phase (i.e., Technology detection phase; Collision resolution phase; Activation phase). This is because from the very beginning during the Initial Detection phase, the Initiator already knows the Target's information (e.g., involved NFC technology, protocol, etc.). The Target's information does not change as long as the Target is not removed.

The removal detection may be monitored in real time by periodical beacon messages in PROBE state (namely, Initiator periodically turns off the NFC field for a period T_probe and exchanges the NFC_NDFC_PROBE message/reply with peer device). The message, T_probe, can be customized to guarantee that the peer device is not replaced by another NFC device during such a short time slot of T_probe. Therefore, Initiator does not need to re-pass Detection phase to re-detect these information of the Target (e.g., involved NFC technology, protocol, etc.) before re-enabling the NFC field and re-starting the communication with Target.

In an embodiment of the NDFC method, timeout (e.g., N retransmission timeout) of receiving an expected message (e.g., answer to a NDFC command or an application data command) may lead Initiator or Target to return back to IDLE state. As an extended option in NDFC method: In PCD-PICC and Passive P2P modes, if the Target device is totally powered by Initiator's NFC field (e.g., Target is a NFC interface tag integrating a temperature sensor which is also powered by Initiator's NFC field), Target may request Initiator to turn on the NFC field to power its hardware (e.g., sensor measurements) for some additional timeslots; In this case, during Data Exchange state, Target can send a NFC_NDFC_FIELD_ON_REQ message to request Initiator to keep the field ON for maximum X timeslots from current time (i.e. X is custom configured in message); If Initiator agrees, it then sends NFC_NDFC_FIELD_ON_ACK message to Target and keeps the NFC field ON; Data can also be exchanged while the field is kept ON by the Initiator. Initiator will finally turn off the NFC field and enter into PROBE state after: either it receives the message NFC_NDFC_SESSION_OVER_ACK from Target before running out of X timeslots; or X timeslots run out.

As an extended option in NDFC method: In P2P active mode, the Target in PROBE state can also trigger a new P2P application data exchange session at any time (without waiting for receiving NFC_NDFC_PROBE beacon message before sending data). Target can enable RF field and trigger application P2P data exchange directly at any time without re-passing the Detection phase, since the information (e.g. involved NFC technology, protocol, etc.) of the peer device has already been known from the very beginning during the first Detection phase.

As stated, in one embodiment, the NFC RF carrier can be turned off if no application needs to be exchanged. The NFC RF carrier can be dynamically turned on to trigger application data exchange directly without re-passing or going through the Initial Detection phase. That is because from the very beginning during the first initial Detection phase, NFC device has already known the information of its peer device (e.g., involved NFC technology, protocol, etc.). This information does not change as long as the peer device is not removed. The removal detection may be monitored in real time by periodical beacon messages in PROBE state (namely, Initiator periodically turns off the NFC field for a period T_probe and exchanges the NFC_NDFC_PROBE message/reply with peer device). The message, T_probe, can be customized to guarantee that the peer device is not replaced by another NFC device during such a short time slot of T_probe.

For the long term based NFC real time communication, if it is assumed that data needs to be periodically exchanged once (during timeslot t1) every T. In conventional NFC communications, the NFC field has to be continually powered on. According to the disclosed NDFC method, NFC field is only powered during the data exchange and probe beacon messages exchange, if we define that the timeslot for each beacon message exchange is t2, then we define the NFODR (NFC Field-On Duration Ratio), the ratio of the field-on duration to the whole period T:

$$NFODR = \frac{\frac{(T-t1)t2}{t\_probe + t2} + t1}{T}$$

For the NFC communications, almost all the energy is consumed to power the NFC field, which means that the disclosed process enables much less power consumption as compared to the conventional NFC protocol which has a gain=1/NFODR.

By way of example, if data is periodically exchanged once (during 50 ms) every minute (T=60*1000 ms), t1=50 ms, t2=5 ms, t_probe=800 ms, then NFODR=0.007, which means the disclosed method and system consume only 0.7% of the energy which would have been consumed with the conventional NFC implementation. The disclosed method and systems significantly extend battery life.

In one embodiment, the proposed NDFC method may be disabled by default in a NFC device, and it can be easily enabled (i.e. via sending NFC_NDFC_REQ command/reply) according to user's requirements and practical scenarios. In one implementation, the disclosed embodiments may be integrated in an Original Equipment Manufacturer's (OEM) device. In another embodiment, the disclosed embodiments may be stored in a computer readable storage medium, hardware, software, firmware or a combination thereof to direct one or more processor circuitry for implementing NDFC. The disclosed embodiments may also be implemented on actual or virtual processor modules. Finally, the disclosed embodiments may be offered on legacy NFC-compatible devices or on new devices.

Figure 4:
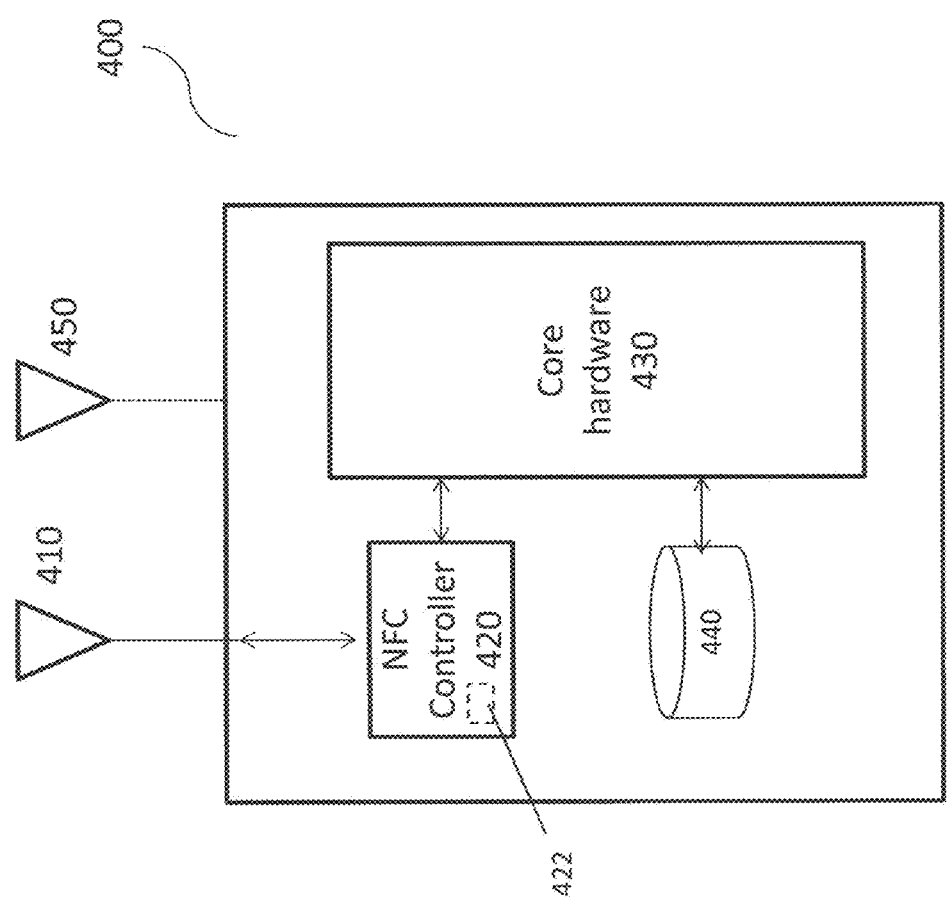
FIG. 4 shows an exemplary system for implementing an embodiment of the disclosure.

FIG. 4 schematically illustrates a system for implementing an embodiment of the disclosure. For example, the steps of any of the above-disclosed flow diagrams may be implemented at the system of FIG. 4. System 400 of FIG. 4 may define a mobile device such as a smartphone, a tablet, an AP, a router or any NFC-compatible. In an exemplary embodiment, system 400 may define a smart device having several communication modalities (e.g., WiFi, Cellular and WiMax). The smart device may also be configured for NFC communication in addition to other communication modalities.

System 400 includes NFC antenna 410, and may optionally include other wireless antennas 450, such like WLAN, Bluetooth, 3G, 4G, WiMax, etc. If a NFC signal is received at system 400, it may be relayed to NFC controller 420. NFC Controller 420 can communicate with core hardware 430 of system 400 directly. Although not shown, system 400 may be connected to a wireless networks (e.g., WLAN, 3G/4G, Bluetooth, Zigbee, Wimax, etc.) or the internet backbone.

Processor 430 may send or receive data from another NFC device via NFC controller 420 and NFC antenna 410. Optionally, it can also communicate with external device via wireless antenna 450. Processor 430 may include one or more modules to execute NDFC method by determining whether to turn ON the NFC RF field to support application data exchange or to maintain the NFC in Probe mode to save energy. Processor circuitry 430 may also communicate with memory circuit 440 where high layer software is stored, and communicate with NFC Controller 420 which contains a memory 422 storing Firmware. The method presented in the current disclosure may be implemented in 422 (e.g., as firmware) in NFC Controller 420, or implemented partly in 422 and 440.

Memory circuit 422 and 440 may define a tangible, non-transitory, computer readable medium containing a set of instructions to cause processor circuitry 430 to perform a process, via NFC Controller 420, including: engaging an initial detection phase; transmitting a probe message from the initiator device to the target device and receiving a probe reply message, the probe reply message denoting whether a target device is present within the NFC session field, and whether the target device has application data for transmission; identifying whether there is application data for transmission from the Initiator or the Target device and; starting an NFC session between the initiator device and the target device if application data is available; and if no application data is available for active transmission, dynamically turning off the Radio Frequency (RF) field and entering into Probe State.

It is noted that the initial Detection phase may conform to the current NFC forum standard and also is used in this invention in the very beginning phase. The exchange of data during the Detection phase is not a probe message. Instead, the Probe state occurs after the Detection State. Additional models and/or logic processors (not shown) may be included to engage other communication modalities associated with system 400 on as-needed basis.

The following non-limiting exemplary embodiments are presented to further illustrate the disclosed principles. Example 1 is directed to a method to conduct dynamic Near-Field Communication (NFC) session by an initiator device, the method comprising: engaging an initial detection; transmitting a probe message from the initiator device to a target device and receiving a probe reply message, the probe reply message denoting whether the target device is present within the NFC session field and/or whether the target device has application data for transmission; identifying whether there is application data for transmission from the initiator device or the target device; starting an NFC session with the target device if application data is available; and if no application data is available for active transmission, dynamically turning off the Radio Frequency (RF) field and entering into Probe state.

Example 2 is directed to the method of example 1, wherein engaging in an initial detection phase includes initiating technology detection, collision resolution and activation states.

Example 3 is directed to the method of example 1, wherein the step of identifying application data for transmission further comprises determining if either the initiator device or the target device has application data to communicate.

Example 4 is directed to the method of example 3, further comprising transmitting a probe message from the initiator device to the target device and receiving a probe reply message at the initiator device from target device.

Example 5 is directed to the method of example 2, further comprising bypassing the initial detection phase before NFC field is re-enabled to support communications with the target device.

Example 6 is directed to the method of example 1, further comprising maintaining at least one of the initiator device or the target device at Probe State if no application data is available for transmission from at least one of the Initiator device or the target device.

Example 7 is directed to an initiator device comprising one or more processors and circuitry, the circuitry including a first logic configured for: engaging an initial detection phase; transmitting a probe message to a target device to receive a probe reply message, the probe reply message determining whether the target device is present within the NFC session field; determining availability of application data for transmission from the initiator device or the target device; starting an NFC session with the target device if application data is available for transmission; and if no application data available for active transmission, dynamically turning off a Radio Frequency (RF) field and entering into Probe state.

Example 8 is directed to the apparatus of example 7, wherein engaging in an initial detection phase includes technology detection, collision resolution and activation states.

Example 9 is directed to the apparatus of example 7, wherein the step of identifying application data for transmission further comprises determining if at least one of the initiator device or the target device has application data to communicate.

Example 10 is directed to the apparatus of example 9, further comprising transmitting a probe message from the initiator device to the target device and receiving a probe reply message at the initiator device from the target device.

Example 11 is directed to the apparatus of example 8, further comprising bypassing the initial detection phase before NFC field is re-enabled to support communications with the target device.

Example 12 is directed to the apparatus of example 7, further comprising maintaining at least one of the initiator device or the target device at Probe State if no application data is available for transmission from at least one of the Initiator device or the target device.

Example 13 is directed to the apparatus of example 7, further comprising a front-end radio and an antenna in communication with the front-end radio.

Example 14 is directed to a tangible computer-readable storage device containing a set of instructions to cause an initiator device to perform a process comprising: engaging an initial detection; transmitting a probe message from the initiator device to the target device and receiving a probe reply message, the probe reply message denoting whether a target device is present within the NFC session field and/or whether the target device has application data for transmission; determining availability of application data for active transmission from the initiator device or the target device; and starting an NFC session with the target device if application data is available; if no application data available for active transmission, dynamically turning off the Radio Frequency (RF) field and entering into Probe state.

Example 15 is directed to the tangible computer-readable storage device of example 14, wherein engaging an initial detection phase includes initiating technology detection, collision resolution and activation states.

Example 16 is directed to the tangible computer-readable storage device of example 14, wherein the step of determining availability of application data for active transmission further comprises determining if at least one of the initiator device or the target device has application data to communicate.

Example 17 is directed to the tangible computer-readable storage device of example 16, further comprising transmitting a probe message from the initiator device to the target device and receiving a probe reply message at the initiator device from the target device.

Example 18 is directed to the tangible computer-readable storage device of example 17, further comprising bypassing the initial detection phase before NFC field is re-enabled to support communications with the target device.

Example 19 is directed to the tangible computer-readable storage device of 14, further comprising maintaining at least one of the initiator device or the target device at Probe State if no application data is available for transmission from at least one of the initiator device or the target device.

Example 20 is directed to the tangible computer-readable storage device of 14, wherein the initiator device further comprises a front-end radio and an antenna in communication with the front-end radio.

While the principles of the disclosure have been illustrated in relation to the exemplary embodiments shown herein, the principles of the disclosure are not limited thereto and include any modification, variation or permutation thereof.

What is claimed is:

1. A method to conduct dynamic Near-Field Communication (NFC) session by an initiator device, the method comprising:
    engaging an initial detection;
    transmitting a probe message from the initiator device to a target device and receiving a probe reply message, the probe reply message denoting whether the target device is present within the NFC session field and/or whether the target device has application data for transmission;
    identifying whether there is application data for transmission from the initiator device or the target device;
    starting an NFC session with the initiator device if application data is available; and
    if no application data is available for active transmission, dynamically turning off the Radio Frequency (RF) field and entering into Probe state.

2. The method of claim 1, wherein engaging in an initial detection phase includes initiating technology detection, collision resolution and activation states.

3. The method of claim 1, wherein the step of identifying application data for transmission further comprises determining if either the initiator device or the target device has application data to communicate.

4. The method of claim 3, further comprising transmitting a probe message from the initiator device to the target device and receiving a probe reply message at the initiator device from target device.

5. The method of claim 2, further comprising bypassing the initial detection phase before NFC field is re-enabled to support communications with the target device.

6. The method of claim 1, further comprising maintaining at least one of the initiator device or the target device at Probe State if no application data is available for transmission from at least one of the Initiator device or the target device.

7. An initiator device comprising one or more processors and circuitry, the circuitry including a first logic configured for:
    engaging an initial detection phase;
    transmitting a probe message to a target device to receive a probe reply message, the probe reply message determining whether the target device is present within the NFC session field;
    determining availability of application data for transmission from the initiator device or the target device;
    starting an NFC session with the target device if application data is available for transmission; and
    if no application data available for active transmission, dynamically turning off a Radio Frequency (RF) field and entering into Probe state.

8. The apparatus of claim 7, wherein engaging in an initial detection phase includes technology detection, collision resolution and activation states.

9. The apparatus of claim 7, wherein the step of identifying application data for transmission further comprises determining if at least one of the initiator device or the target device has application data to communicate.

10. The apparatus of claim 9, further comprising transmitting a probe message from the initiator device to the target device and receiving a probe reply message at the initiator device from the target device.

11. The apparatus of claim 8, further comprising bypassing the initial detection phase before NFC field is re-enabled to support communications with the target device.

12. The apparatus of claim 7, further comprising maintaining at least one of the initiator device or the target device at Probe State if no application data is available for transmission from at least one of the Initiator device or the target device.

13. The apparatus of claim 7, further comprising a front-end radio and an antenna in communication with the front-end radio.

14. A tangible computer-readable storage device containing a set of instructions to cause an initiator device to perform a process comprising:
    engaging an initial detection;
    transmitting a probe message from the initiator device to the target device and receiving a probe reply message, the probe reply message denoting whether a target device is present within the NFC session field and/or whether the target device has application data for transmission;
    determining availability of application data for active transmission from the initiator device or the target device; and
    starting an NFC session with the target device if application data is available;
    if no application data available for active transmission, dynamically turning off the Radio Frequency (RF) field and entering into Probe state.

15. The tangible computer-readable storage device of claim 14, wherein engaging an initial detection phase includes initiating technology detection, collision resolution and activation states.

16. The tangible computer-readable storage device of claim 14, wherein the step of determining availability of application data for active transmission further comprises determining if at least one of the initiator device or the target device has application data to communicate.

17. The tangible computer-readable storage device of claim 16, further comprising transmitting a probe message from the initiator device to the target device and receiving a probe reply message at the initiator device from the target device.

18. The tangible computer-readable storage device of claim 17, further comprising bypassing the initial detection phase before NFC field is re-enabled to support communications with the target device.

19. The tangible computer-readable storage device of 14, further comprising maintaining at least one of the initiator device or the target device at Probe State if no application data is available for transmission from at least one of the initiator device or the target device.

20. The tangible computer-readable storage device of 14, wherein the initiator device further comprises a front-end radio and an antenna in communication with the front-end radio.

* * * * *